(12) United States Patent
Mroueh et al.

(10) Patent No.: US 8,009,757 B2
(45) Date of Patent: Aug. 30, 2011

(54) METHOD AND APPARATUS FOR ENCODING A MODULATED SIGNAL IN A COMMUNICATION SYSTEM

(75) Inventors: Lina Mroueh, Paris (FR); Marc Bernard De Courville, Paris (FR); Laurent S. Mazet, Paris (FR); Stephanie Rouquette-Leveil, Massy (FR)

(73) Assignee: Motorola Mobility, Inc., Libertyville, IL (US)

( * ) Notice: Subject to any disclaimer, the term of this patent is extended or adjusted under 35 U.S.C. 154(b) by 756 days.

(21) Appl. No.: 11/938,452

(22) Filed: Nov. 12, 2007

(65) Prior Publication Data

US 2009/0122906 A1 May 14, 2009

(51) Int. Cl.
H04L 27/00 (2006.01)
(52) U.S. Cl. ...................................................... 375/295
(58) Field of Classification Search .................. 375/261, 375/295, 298
See application file for complete search history.

(56) References Cited

U.S. PATENT DOCUMENTS

| 6,512,797 | B1 | 1/2003 | Tellado et al. |
| 2005/0063242 | A1 | 3/2005 | Ren |
| 2005/0163242 | A1* | 7/2005 | Ungerboeck ................. 375/261 |
| 2006/0198459 | A1 | 9/2006 | Fischer et al. |

FOREIGN PATENT DOCUMENTS

| WO | 2006-048037 A1 | 5/2006 |
| WO | 2006071187 A2 | 7/2006 |

OTHER PUBLICATIONS

Choi, Jin Ho: The International Search Report and The Written Opinion of the International Searching Authority, or the Declaration, Korean Intellectual Property Office, Republic of Korea, completion May 27, 2009, mailed May 27, 2009.

Hochwald, Bertrand M. et al.: A Vector-Pertrubation Technique for Near-Capacity Multiantenna Multiuser Communication-Part II: Perturbation, IEEE Transactions on Communications, vol. 53, No. 3, Mar. 2005, pp. 537-544.

Tellado, Jose et al.: PAR reduction with minimal or zero bandwidth loss and low complexity (98-173), T1E1.4/98-173, Project: TIE1. 4:VDSL, Jun. 1-5, 1998, pp. 1-12.

Vishwanath, Sriram et al: Duality, Achievable Rates, and Sun-Rate Capacity of Gaussian MIMO Broadcast Channels, IEEE Transactions on Information Theory, vol. 49, No. 10, Oct. 2003, pp. 2658-2668.

Tomlinson, M.: New Automatic Equaliser Employing Moulo Arithmetic, Electronics Letters, Mar. 25, 1971, vol. 7, Nos. 5/6, pp. 138-139.

Choi, Lai-U et al.: A transmit preprocessing technique for multiuser mimo systems using a decomposition approach, IEEE Transactions on Wireless Communications, 3, Jan. 2004, pp. 20-24.

(Continued)

Primary Examiner — David C. Payne
Assistant Examiner — Leon-Viet Q Nguyen

(57) ABSTRACT

Disclosed is a method and apparatus for encoding a modulated signal in a communication system. The method comprises generating an initial constellation, applying a vertical axis symmetry to the initial constellation to generate a first resulting constellation, translating the first resulting constellation to a left direction of the initial constellation to produce a left flipped constellation, applying a horizontal axis symmetry to the initial constellation to generate a second resulting constellation, translating the second resulting constellation to an up direction of the initial constellation to produce an up flipped constellation, applying a central axis symmetry to the initial constellation to generate a third resulting constellation; and translating the third resulting constellation to a left-up direction of the initial constellation to produce a left-up flipped constellation.

17 Claims, 4 Drawing Sheets

OTHER PUBLICATIONS

Jindal, N. et al.: Sum power iterative water-filling for multi-antenna gaussian broadcast channels, IEEE Transactions on Information Theory, vol. 51, No. 4, pp. 1570-1580, Apr. 2005.

Peel, Christian B. et al.: A vector-perturbation technique for near-capacity multiantenna multiuser communication part !: Channel inversion and regularization, IEEE Transactions on Communication vol. 53, No. 1, Jan. 2005, pp. 195-202.

Sharif, Masoud et al.: On the capacity of mimo broadcast channels with partial side information, IEEE Transaction on Information Theory, vol. 51, No. 2, Feb. 2005, pp. 506-511.

* cited by examiner

METHOD AND APPARATUS FOR ENCODING A MODULATED SIGNAL IN A COMMUNICATION SYSTEM

FIELD OF THE DISCLOSURE

The present disclosure relates generally to communication systems and more particularly to encoding a modulated signal in a communication system.

BACKGROUND

Multi-user multi input multi output (MIMO) communication systems allow a plurality of users to access the same resource simultaneously. Allowing a plurality of users to access the same resource simultaneously requires that the MIMO communication system have multiple antennas at the transmitter and at the receiver. However, to accommodate the increased number of users without impacting throughput, a number of techniques are used.

One technique, downlink pre-equalization utilizes linear precoding at the transmitter for interference suppression to increase the number of users, but suffers from the limitation of unconstrained transmitted energy on the multiple antennas. Another technique, dirty paper coding (DPC) utilizes non-linear precoding at the transmitter for interference suppression to increase the number of users. DPC constrains the transmitted energy on the multiple antennas by applying constellation mapping, such as replicated constellation mapping. Constellation mapping means to encode the data to be transmitted as a lattice. In replicated constellation mapping, an initial constellation is replicated to produce replicated constellations. An image of the symbol to be transmitted from the initial constellation is selected from the replicated constellations and transmitted from the transmitter. The image of the symbol in the replicated constellations is then received at the receiver. The receiver applies a modulo function to recover a corresponding point to the received signal. However, since the replicated constellation does not address the impact of noise on the modulo function, errors are caused in the detection of the encoded signal. Thus, even existing DPC techniques are deficient.

Accordingly, there exists a need for a new method for encoding a modulated signal in a communication system.

BRIEF DESCRIPTION OF THE FIGURES

The accompanying figures, where like reference numerals refer to identical or functionally similar elements throughout the separate views, together with the detailed description below, are incorporated in and form a part of the specification, and serve to further illustrate embodiments of concepts that include the claimed invention, and explain various principles and advantages of those embodiments.

Figure 1:
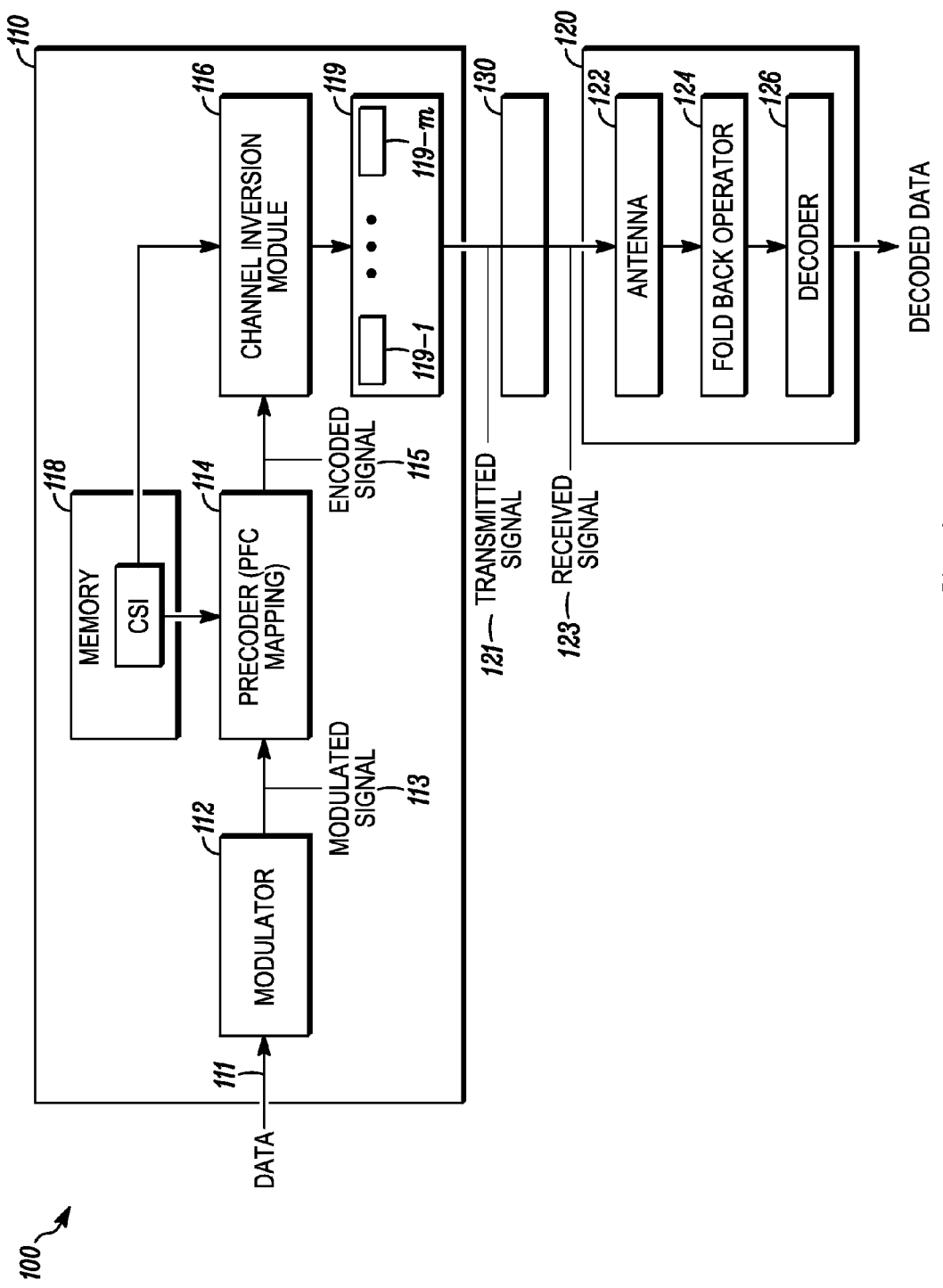
FIG. 1 is a block diagram of a multi-user MIMO communication system in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed is a method and apparatus for encoding a modulated signal in a communication system. The method comprises generating an initial constellation of the modulated signal, wherein the initial constellation has initial symbols defined by an initial symbol abscissa and an initial symbol ordinate. A vertical axis symmetry is applied to the initial constellation to generate a first resulting constellation comprising first resulting symbols defined by a first resulting symbol abscissa and a first resulting symbol ordinate. The first resulting constellation is translated to a left direction of the initial constellation to produce a left flipped constellation comprising left flipped symbols defined by a left flipped symbol abscissa and a left flipped symbol ordinate. A horizontal axis symmetry is applied to the initial constellation to generate a second resulting constellation comprising second resulting symbols defined by a second resulting symbol abscissa and a second resulting symbol ordinate. Finally, the second resulting constellation is translated to an up direction of the initial constellation to produce an up flipped constellation comprising up flipped symbols defined by an up flipped symbol abscissa and an up flipped symbol ordinate.

FIG. 1 is a block diagram of a multi-user MIMO communication system 100 in accordance with some embodiments of the present invention. The multi-user MIMO communication system 100 comprises a base station 110 (referred to herein as a transmitter 110) and a mobile station 120 (referred to herein as receiver 120) communicating via a communication link 130, e.g. an over the air channel. Even though only one receiver 120 is shown, any number of receivers may interface with transmitter 110. Thus, the depiction of one receiver 120 is not meant to be a limitation on an embodiment of the present invention. In any case, the multi-user MIMO communication system 100 enables the transmitter 110 to communicate with a receiver 120 or a number of receivers simultaneously.

The transmitter 110 of the multi-user MIMO communication system 100 comprises a modulator 112, a precoder 114, a channel inversion module 116, a memory 118, and multiple antennas 119-1 through 119-m. The modulator 112 modulates data 111 to be transmitted to produce a modulated signal 113. The modulated signal 113 is fed into the precoder 114. The precoder 114 computes channel inversion information and perturbation information for the modulated signal 113. The precoder 114 further perturbs the modulated signal 113 based on channel inversion information, perturbation information, and information received from the memory 118 to obtain an encoded signal 115. In one example, the memory 118 stores channel state information and the channel state information is used to perturb the modulated signal 113. In any case, the precoder 114 perturbs the modulated signal 113 by encoding the modulated signal 113 to obtain the encoded signal 115. In one example, the process of perturbing the modulated signal 113 to obtain the encoded signal 115 is called periodically flipped constellation mapping. The encoded signal 115 is fed into the channel inversion module 116 so that the channel inversion information and the channel state information is applied to the encoded signal 115 to allow signals to be directed into one of the multiple antennas 119-1 through 119-m which then radiates a transmitted signal 121 via the communication link 130 to the receiver 120.

The receiver 120 of the multi-user MIMO communication system 100 comprises at least one antenna 122, a fold back operator 124 and a decoder 126. The antenna 122 of the receiver 120 receives the transmitted signal 121 from the transmitter 110 and feeds the received signal 123 to the fold back operator 124. The fold back operator 124 performs fold back operation on the received signal 123 to eliminate perturbation, and sends the resulting signal to the decoder 126. The decoder 126 decodes to detect the original data (referred to as "decoded data").

Figure 2:
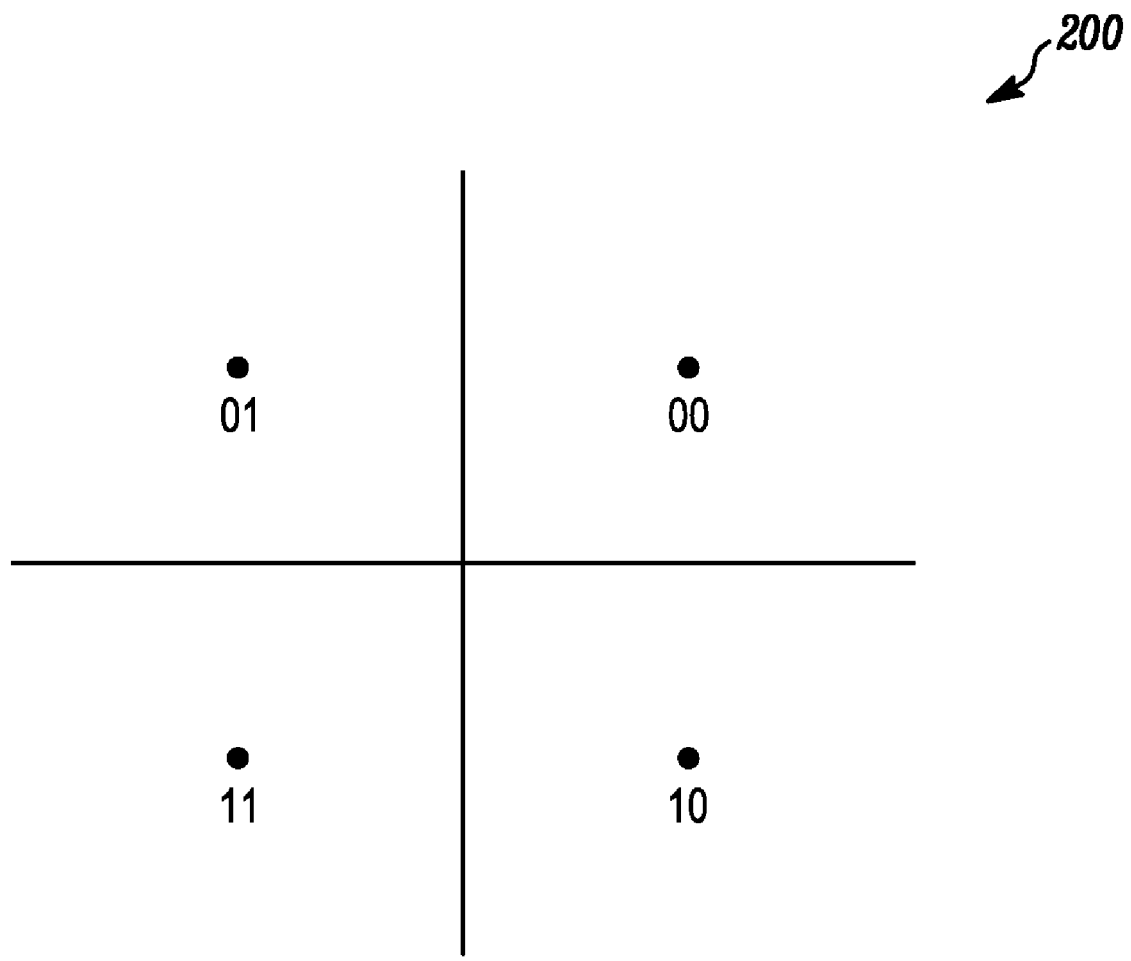
FIG. 2 is a constellation diagram for a quadrature phase shift keying (QPSK) modulated signal in accordance with some embodiments of the present invention.

FIG. 2 illustrates a constellation diagram 200 representing a 4-quadrature amplitude modulation (4-QAM) modulated signal, e.g. modulated signal 113. As is known to a person of ordinary skill in the art, a constellation diagram represents symbols of a modulated signal on a two dimensional scatter plane. In specific implementations, a constellation diagram may represent all possible symbols of a modulated signal. For example, a 4-QAM modulated signal may be represented by four possible symbols i.e. 00, 01, 10, and 11. Each of the four possible symbols of the 4-QAM modulated signal is mapped to one of the four quadrants associated with the constellation diagram 200.

Figure 3:
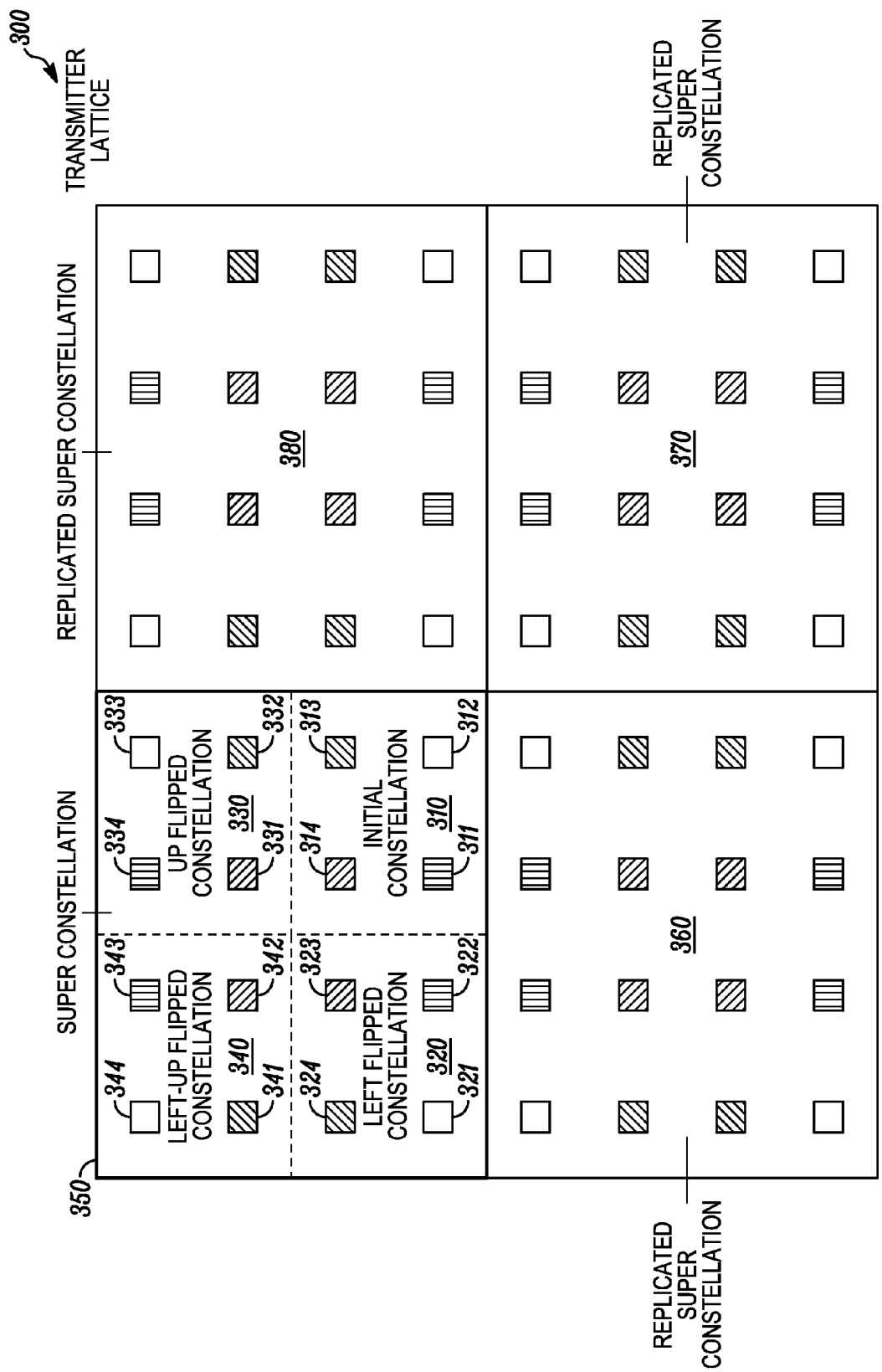
FIG. 3 is a periodically flipped constellation mapping for encoding a QPSK modulated signal according to some embodiments of the present invention.

FIG. 3 illustrates encoding a 4-QAM modulated signal according to one embodiment of the present invention. After data modulation is performed at the transmitter 110 to yield a modulated signal 113, a lattice 300 is generated at the transmitter 110 (referred to herein as a "transmitter lattice") to facilitate encoding of the modulated signal 113. As used herein, the term "lattice" refers to a plurality of constellation diagrams scattered on a two dimensional plane. According to one implementation of the present invention, the lattice 300 is generated by periodically flipped constellation mapping as described below to yield an encoded signal 115. In any case, the encoded signal 115 is transmitted to the receiver 120.

In periodically flipped constellation mapping, the modulated signal 113 is represented as an initial constellation 310 where the modulated signal 113 has initial symbols 311-314. The initial symbols 311-314 are defined by an initial symbol abscissa and an initial symbol ordinate. A vertical axis symmetry is applied to the initial constellation 310 to generate a first resulting constellation (not shown). As used herein, the term "vertical axis symmetry" refers to translation of an abscissa of a symbol into its additive inverse while maintaining an ordinate of the symbol. The generated first resulting constellation comprises first resulting symbols defined by a first resulting symbol abscissa and a first resulting symbol ordinate, such that the first resulting symbol abscissa for each of the first resulting symbol translates into an additive inverse of the initial symbol abscissa while the first resulting symbol ordinate has the same value as the initial symbol ordinate.

The first resulting constellation is then translated to a left direction of the initial constellation to produce a left flipped constellation 320. The left flipped constellation 320 comprises left flipped symbols 321-324 defined by a left flipped symbol abscissa and a left flipped symbol ordinate. A horizontal axis symmetry is then applied to the initial constellation 310 to generate a second resulting constellation (not shown). As used herein, the term "horizontal axis symmetry" refers to translation of an ordinate of a symbol into its additive inverse while maintaining an abscissa of the symbol. The second resulting constellation comprises second resulting symbols defined by a second resulting symbol abscissa and a second resulting symbol ordinate, such that the second resulting symbol ordinate translates into an additive inverse of the initial symbol ordinate while the second resulting symbol abscissa has a same value as the initial symbol abscissa. The second resulting constellation is translated to an up direction of the initial constellation 310 to produce an up flipped constellation 330. The up flipped constellation 330 comprises up flipped symbols 331-334 defined by an up flipped symbol abscissa and an up flipped symbol ordinate.

A central axis symmetry is then applied to the initial constellation 310 to generate a third resulting constellation (not shown). As used herein, the term "central axis symmetry" refers to translation of an abscissa and an ordinate of a symbol to their corresponding additive inverses. The third resulting constellation comprises third resulting symbols defined by a third resulting symbol abscissa and a third resulting symbol ordinate, such that the third resulting symbol abscissa translates into an additive inverse of the initial symbol abscissa and the third resulting symbol ordinate translates into an additive inverse of the initial symbol ordinate. The third resulting constellation is translated to a left-up direction of the initial constellation 310 to produce a left-up flipped constellation 340. The left-up flipped constellation 340 comprises left-up flipped symbols 341-344 defined by a left-up flipped symbol abscissa and a left-up flipped symbol ordinate.

In one embodiment, the left-up flipped constellation 340 is produced by applying a vertical axis symmetry to the up flipped constellation 330 to generate a third resulting constellation and then translating the third resulting constellation to a left direction of the up flipped constellation 330. In another embodiment, the left-up flipped constellation 340 is produced by applying a horizontal axis symmetry to the left flipped constellation 320 to generate the third resulting constellation and then translating the third resulting constellation to an up direction of the left flipped constellation 320.

The initial constellation 310, the left flipped constellation 320, the up flipped constellation 330 and the left-up flipped constellation 340 define a super constellation 350. In one embodiment, the super constellation 350 is replicated to produce a plurality of replicated super constellations 360, 370, and 380 forming a transmitter lattice 300. In another embodiment, the super constellation 350 is periodically replicated to form the transmitter lattice 300. In another embodiment, the transmitter lattice 300 is infinite. In such an embodiment, a shrink operation can be applied to the infinite transmitter lattice to produce a finite lattice.

Although FIG. 3 illustrates the initial constellation 310 in a bottom right of the super constellation 350, the initial constellation 310 may also be placed anywhere in the super constellation 350, e.g., at a bottom left, or top left or top right of the super constellation 350. In one embodiment, when the initial constellation 310 is placed in a bottom left, then the super constellation 350 comprises the initial constellation 310, a right flipped constellation (not shown), the up flipped constellation 330 and a right-up flipped constellation (not shown). In another embodiment, when the initial constellation 310 is placed in a top left of the super constellation 350, then the super constellation 350 comprises the initial constellation 310, a down flipped constellation (not shown), a right flipped constellation (not shown), and a right-down flipped constellation (not shown). In another embodiment, when the initial constellation 310 is placed in a top right of the super constellation 350, then the super constellation 350 comprises the initial constellation 310, the left flipped constellation 320, a down flipped constellation (not shown), and a left-down flipped constellation (not shown).

According to another implementation of the present invention, the transmitter lattice 300 is produced by periodically replicating the initial constellation 310 to produce a plurality of replicated constellations. Then using the plurality of replicated constellations and the initial constellation 310, a plurality of left flipped constellations and a plurality of up flipped constellations are generated. Regardless of how the transmitter lattice 300 is produced, the transmitter lattice 300 facilitates encoding of the modulated signal 113 at a transmitter, e.g. transmitter 110.

Figure 4:
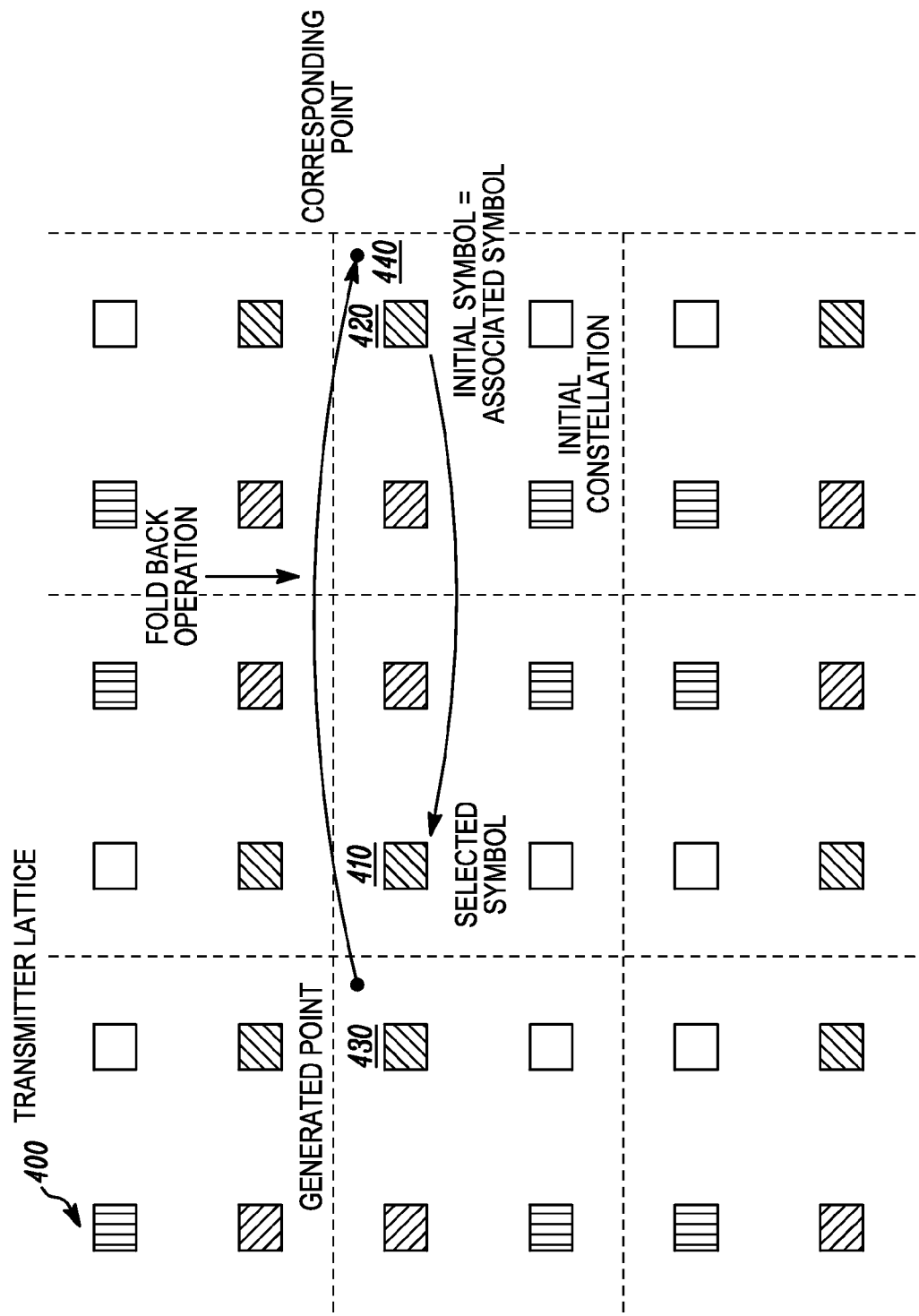
FIG. 4 is an example of an operation being performed at the transmitter and the receiver according to some embodiments of the present invention.

FIG. 4 is a diagram illustrating the operation being performed at the transmitter 110 and the receiver 120 according to some embodiments of the present invention. At the transmitter 110, a symbol 410 is selected from the transmitter lattice 400. The selected symbol 410 is an image of the initial symbol 420 in the initial constellation 310. For example, the selected symbol 410 may be symbol 324 in the left flipped constellation because symbol 324 is an image of the initial symbol 313 in the initial constellation 310. Regardless of the location of the selected symbol 410 in the transmitter lattice 400, the selected symbol 410 forms an encoded signal that is transmitted to the receiver 120. The process of selecting the symbol and transmitting the selected symbol to the receiver 120 can be repeated for each symbol corresponding to the data 111. As is appreciated by a person or ordinary skill in the art, selecting images of symbols, instead of initial symbols, constrains transmitted energy.

When the receiver 120 receives the transmitted signal 121 from the transmitter 110, a point 430 is generated relating to the received symbol of the received signal 123 on a receiver lattice of the receiver 120. Although the point 430 is generated on the receiver lattice, for purposes of illustration, the generated point 430 is depicted in the transmitter lattice 400 of FIG. 4, and thus the depiction of the generated point on the transmitter lattice 400 is not meant to be limitation on an embodiment of the present invention. As used herein, the term "receiver lattice" refers to a lattice generated at the receiver 120 corresponding to the transmitter lattice 400. Within the receiver lattice, a corresponding point 440 to the generated point 430 is mapped in an initial constellation of the receiver lattice. Although the corresponding point 440 is mapped on the receiver lattice, for purposes of illustration, the corresponding point 440 is depicted in the transmitter lattice 400 of FIG. 4, and thus the depiction of the corresponding point on the transmitter lattice 400 is not meant to be limitation on an embodiment of the present invention. In one embodiment, mapping of the corresponding point 440 is performed using the fold back operator 124 of the receiver 120 based on a modulo function. After mapping, a symbol, e.g. symbol 420, is associated to the corresponding point 440 in the initial constellation of the receiver lattice and then the associated symbol, e.g. symbol 420, is decoded to get the original information.

As is known to a person of ordinary skill in the art, any number of modulo functions may be used for the fold back operator 124. When the transmitted signal (e.g. 121) is chosen to minimize the transmitted power and a specific modulo function is applied to the received signal (e.g. 123), e.g. as described below, the MIMO communication system 100 is said to apply a dirty paper coding technique called sphere encoding. As is known, the above described periodically flipped constellation mapping can be applied to any dirty paper coding technique and the description with reference to sphere encoding is not meant to be a limitation on embodiments of the present invention.

Mathematically, operation of a multi-user MIMO communication system (e.g. 100) is described below. At the transmitter (e.g. 110) of the multi-user MIMO communication system where a base station (e.g. 110) having multiple antennas (e.g. 119-1 through 119-$m$) and k receivers (e.g. 120) having a single antenna, considering that d=[d1, d2, ..., dk]$^T$ represents a vector of data symbols (e.g. 111) to be transmitted, S represents the encoded signal 115 obtained by applying perturbation to the modulated signal, e.g. 113, at the precoder 114, and x represents the transmitted signal (e.g. 121) (obtained after applying channel inversion to the encoded signal). The transmitted signal x from each of the multiple antennas 119-1 through 119-$m$ can be represented as x=(1/$\sqrt{\gamma}$)S (Equation 1), where $\gamma$ represents a scaling factor, which is an indicator of the transmitted power.

In an example, the encoded signal S obtained by applying perturbation to the modulated signal 113 at the precoder 114 is represented as S=H$^+$(d+$\tau\bar{d}$) (Equation 2), where H$^+$ is a pseudo inverse channel matrix, H$^+$=H*(HH*)$^{-1}$ and H is a k×m matrix represented as H=[h$_{k,m}$], where h$_{k,m}$ is the channel gain between a transmit antenna m, for example antenna 119-$m$ and a receiver k, for example receiver 120. Note that * represents the hermitian transposition of a matrix. $\tau$ is chosen in order to get a periodic extension of the signal constellation at the channel output, i.e. $\tau$=2($c_{max}$+$\Delta$/2) where $c_{max}$ is the distance from an origin to a farthest constellation point; $c_{max}$=1 for binary phase shift keying (BPSK) modulation and QPSK modulation; $c_{max}$=3 for 16-quadrature amplitude modulation (16-QAM), $\Delta$ is the distance between any two constellation points, e.g. $\Delta$=2 for M-QAM constellation, and $\bar{d}$ is a perturbation component associated with selection of an image of a symbol from the transmitter lattice 300. Now, using Equations 1 and 2, the equation for transmitted signal 121 can be derived as $$x = 1/\sqrt{\gamma}\, H^+(d + \tau\bar{d}). \quad \text{(Equation 3)}$$

As described earlier, since the selection of an image of the symbol constrains the transmitted power, the perturbation component $\bar{d}$ is chosen in such a way to minimize the scaling factor $\gamma$. In one embodiment, the scaling factor $\gamma$ indicating the transmitted power can be computed using Equation 4 as represented below.

$$\gamma = \left\| H^+\left((-1)^{[Re(\bar{d})]_2} Re(d) + \tau Re(\bar{d}) + i(-1)^{[Im(\bar{d})]_2} Im(d) + i\tau Im(\bar{d})\right) \right\|^2$$

In Equation 4, when the perturbation component $\bar{d}$ is even, then the real component $(-1)^{[Re(\bar{d})]_2}$ and the imaginary component $(-1)^{[Im(\bar{d})]_2}$ of Equation 4 is 1. When the perturbation component $\bar{d}$ is odd, then the real component $(-1)^{[Re(\bar{d})]_2}$ and the imaginary component $(-1)^{[Im(\bar{d})]_2}$ of Equation 4 is $-1$, where $[a]_2$ denotes remainder of $a/2$.

At the receiver 120 of the multi-user MIMO system 100, a received signal 123 can be written using a vector equation $Y=Hx+w$, where $Y=[y_1, y_2 \ldots, y_k]$ represents a vector of signals $y_1, y_2 \ldots, y_k$, wherein each of $y_1, y_2 \ldots, y_k$ represent a signal received at a receiver, e.g. $y_1$ is received at receiver 1, $y_2$ is received at receiver 2 . . . $y_k$ is received at receiver k, and w is a noise vector related to each receiver, e.g. receiver 120. Let $Y_r$ be a signal received by the receiver 120 and $Y_{vect}=[Re(Y_r) Im(Y_r)]$. For each generated point of the received signal 123 on the constellation of the receiver lattice, the fold back operator 124 of the receiver 120 determines whether the constellation image is flipped or not using a variable check, where check=floor $(Y_{vect}/\tau+\frac{1}{2})$. The determined sign of the variable check is applied to the modulo function associated with the receiver 120 using a variable z, such that, $z=(-1)^{check}$. The decoder 126 of the receiver 120 computes $(z\bar{o}f_\tau(Y_{vect}))$ to detect original symbols, where $\bar{o}$ denotes element by element multiplication, and $f_\tau$ represents the modulo function of the receiver 120.

Although, embodiments of the present invention have been described with respect to multi-user MIMO communication systems, it will be appreciated by a person skilled in the art that the periodically flipped constellation mapping of the present invention can be applied to other communication systems, such as an orthogonal frequency division multiplexing (OFDM) system, a discrete multi-tone (DMT) system, communication systems utilizing asymmetric digital subscriber line (ADSL), and the like. Thus, the mention of multi-user MIMO is not meant to be a limitation.

In the foregoing specification, specific embodiments have been described. However, one of ordinary skill in the art appreciates that various modifications and changes can be made without departing from the scope of invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for encoding a modulated signal to be transmitted from a transmitter to a receiver in a communication system, comprising:

generating an initial constellation of the modulated signal, wherein the initial constellation has initial symbols defined by an initial symbol abscissa and an initial symbol ordinate;

applying a vertical axis symmetry to the initial constellation to generate a first resulting constellation comprising first resulting symbols defined by a first resulting symbol abscissa and a first resulting symbol ordinate, wherein the first resulting symbol abscissa is an additive inverse of the initial symbol abscissa and the first resulting symbol ordinate has a same value of the initial symbol ordinate;

translating the first resulting constellation to a left direction of the initial constellation to produce a left flipped constellation comprising left flipped symbols defined by a left flipped symbol abscissa and a left flipped symbol ordinate;

applying a horizontal axis symmetry to the initial constellation to generate a second resulting constellation comprising second resulting symbols defined by a second resulting symbol abscissa and a second resulting symbol ordinate, wherein the second resulting symbol ordinate is an additive inverse of the initial symbol ordinate and the second resulting symbol abscissa has a same value of the initial symbol abscissa;

translating the second resulting constellation to an up direction of the initial constellation to produce an up flipped constellation comprising up flipped symbols defined by an up flipped symbol abscissa and an up flipped symbol ordinate applying a central axis symmetry to the initial constellation to generate a third resulting constellation comprising third resulting symbols defined by a third resulting symbol abscissa and a third resulting symbol ordinate; and translating the third resulting constellation to a left-up direction of the initial constellation to produce a left-up flipped constellation comprising left-up flipped symbols defined by a left-up flipped symbol abscissa and a left-up flipped symbol ordinate.

2. The method of claim 1, wherein the third resulting symbol abscissa is an additive inverse of the initial symbol abscissa and the third resulting symbol ordinate is an additive inverse of the initial symbol ordinate.

3. The method of claim 1, further comprising applying a horizontal axis symmetry to the left flipped constellation to generate a third resulting constellation comprising third resulting symbols defined by a third resulting symbol abscissa and a third resulting symbol ordinate; and translating the third resulting constellation to an up direction of the left flipped constellation to produce a left-up flipped constellation comprising left-up flipped symbols defined by a left-up flipped symbol abscissa and a left-up flipped symbol ordinate.

4. The method of claim 3, wherein the third resulting symbol ordinate is an additive inverse of the left flipped symbol ordinate and the third resulting symbol abscissa has a same value of the left flipped symbol abscissa.

5. The method of claim 1, further comprising applying a vertical axis symmetry to the up flipped constellation to generate a third resulting constellation comprising third resulting symbols defined by a third resulting symbol abscissa and a third resulting symbol ordinate; and translating the third resulting constellation to a left direction of the up flipped constellation to produce a left-up flipped constellation comprising left-up flipped symbols defined by a left-up flipped symbol abscissa and a left-up flipped symbol ordinate.

6. The method of claim 5, wherein the third resulting symbol abscissa is an additive inverse of the up flipped symbol abscissa and the third resulting symbol ordinate has a same value of the up symbol ordinate.

7. The method of claim 1, wherein the initial constellation, the left flipped constellation, the up flipped constellation, and the left-up flipped constellation define a super constellation.

8. The method of claim 7, further comprising replicating the super constellation to produce a transmitter lattice.

9. The method of claim 8, wherein the transmitter lattice is applied to a dirty paper coding technique.

10. The method of claim 8, further comprising:

selecting a symbol from the transmitter lattice, wherein the selected symbol is an image of an initial symbol in the initial constellation; and transmitting the selected symbol to the receiver.

11. The method of claim 10, further comprising repeating the steps of selecting the symbol and transmitting the selected symbol for each symbol corresponding to a data to be transmitted to the receiver.

12. The method of claim 10, further comprising at the receiver:

receiving a signal;

generating a point relating to a received symbol of the received signal on a receiver lattice;

mapping a corresponding point to the generated point in an initial constellation of the receiver lattice;

associating a symbol to the corresponding point in the initial constellation; and decoding the associated symbol.

13. A method for encoding a modulated signal to be transmitted from a transmitter to a receiver in a multi-user multi input multi output communication system, comprising:

generating an initial constellation of the modulated signal, wherein the initial constellation has initial symbols defined by an initial symbol abscissa and an initial symbol ordinate;

applying a vertical axis symmetry to the initial constellation to generate a first resulting constellation comprising first resulting symbols defined by a first resulting symbol abscissa and a first resulting symbol ordinate;

translating the first resulting constellation to a left direction of the initial constellation to produce a left flipped constellation comprising left flipped symbols defined by a left flipped symbol abscissa and a left flipped symbol ordinate;

applying a horizontal axis symmetry to the initial constellation to generate a second resulting constellation comprising second resulting symbols defined by a second resulting symbol abscissa and a second resulting symbol ordinate; and translating the second resulting constellation to an up direction of the initial constellation to produce an up flipped constellation comprising up flipped symbols defined by an up flipped symbol abscissa and an up flipped symbol ordinate;

applying a central axis symmetry to the initial constellation to generate a third resulting constellation comprising third resulting symbols defined by a third resulting symbol abscissa and a third resulting symbol ordinate; and translating the third resulting constellation to a left-up direction of the initial constellation to produce a left-up flipped constellation comprising left-up flipped symbols defined by a left-up flipped symbol abscissa and a left-up flipped symbol ordinate, wherein the initial constellation, the left flipped constellation, the up flipped constellation, and the left-up flipped constellation define a super constellation, and wherein a first symbol of the super constellation is transmitted to the receiver using a dirty paper coding technique.

14. The method of claim 13, wherein generating, applying, and translating are performed by a precoder in the transmitter.

15. The method of claim 13, wherein the dirty paper coding technique is called sphere encoding.

16. The method of claim 13, further comprising
at the receiver:
receiving a signal comprising the first symbol;
generating a point relating to the first symbol on a receiver lattice;
mapping a corresponding point to the generated point in an initial constellation of the receiver lattice;
associating a second symbol to the corresponding point in the initial constellation; and
decoding the second symbol, wherein decoding is performed by a fold back operator in the receiver and wherein the receiver utilizes a modulo function.

17. An apparatus for encoding a modulated signal to be transmitted from a transmitter to a receiver in a communication system, comprising:
means for generating an initial constellation of the modulated signal, wherein the initial constellation has initial symbols defined by an initial symbol abscissa and an initial symbol ordinate;
means for applying a vertical axis symmetry to the initial constellation to generate a first resulting constellation comprising first resulting symbols defined by a first resulting symbol abscissa and a first resulting symbol ordinate, wherein the first resulting symbol abscissa is an additive inverse of the initial symbol abscissa and the first resulting symbol ordinate has a same value of the initial symbol ordinate;
means for translating the first resulting constellation to a left direction of the initial constellation to produce a left flipped constellation comprising left flipped symbols defined by a left flipped symbol abscissa and a left flipped symbol ordinate;
means for applying a horizontal axis symmetry to the initial constellation to generate a second resulting constellation comprising second resulting symbols defined by a second resulting symbol abscissa and a second resulting symbol ordinate, wherein the second resulting symbol ordinate is an additive inverse of the initial symbol ordinate and the second resulting symbol abscissa has a same value of the initial symbol abscissa;
means for translating the second resulting constellation to an up direction of the initial constellation to produce an up flipped constellation comprising up flipped symbols defined by an up flipped symbol abscissa and an up flipped symbol ordinate
means for applying a central axis symmetry to the initial constellation to generate a third resulting constellation comprising third resulting symbol abscissa and a third resulting symbol ordinate; and
means for translating the third resulting constellation to a left-up direction of the initial constellation to produce a left-up flipped constellation comprising left-up flipped symbols defined by a left-up flipped symbol abscissa and a left-up flipped symbol ordinate.

* * * * *